United States Patent
Edman et al.

(10) Patent No.: US 11,801,822 B2
(45) Date of Patent: Oct. 31, 2023

(54) OPERATION OF VEHICLE STATIONARY GENERATOR

(71) Applicant: FORD GLOBAL TECHNOLOGIES, LLC, Dearborn, MI (US)

(72) Inventors: Rian Edman, Dearborn, MI (US); Timothy Baxendale, Royal Oak, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 217 days.

(21) Appl. No.: 17/343,306

(22) Filed: Jun. 9, 2021

(65) Prior Publication Data

US 2022/0396257 A1 Dec. 15, 2022

(51) Int. Cl.
| | |
|---|---|
| *B60W 10/06* | (2006.01) |
| *B60W 20/00* | (2016.01) |
| *B60W 10/26* | (2006.01) |
| *B60W 10/30* | (2006.01) |
| *H04W 4/021* | (2018.01) |
| *B60H 1/00* | (2006.01) |
| *B60Q 3/80* | (2017.01) |
| *B60K 6/24* | (2007.10) |
| *B60K 6/28* | (2007.10) |
| *B60W 10/08* | (2006.01) |
| *B60W 20/11* | (2016.01) |

(52) U.S. Cl.
CPC ............ *B60W 20/00* (2013.01); *B60W 10/06* (2013.01); *B60W 10/26* (2013.01); *B60W 10/30* (2013.01); *H04W 4/021* (2013.01); *B60H 1/00771* (2013.01); *B60K 6/24* (2013.01); *B60K 6/28* (2013.01); *B60Q 3/80* (2017.02); *B60W 10/08* (2013.01); *B60W 20/11* (2016.01); *B60W 2510/244* (2013.01); *B60W 2552/05* (2020.02); *B60W 2554/801* (2020.02); *B60W 2554/802* (2020.02); *B60W 2710/065* (2013.01); *B60W 2710/244* (2013.01); *B60W 2710/305* (2013.01); *B60Y 2200/92* (2013.01)

(58) Field of Classification Search
CPC ....... B60L 58/13; B60W 20/00; B60W 10/06; B60W 10/26; B60W 10/30; H04W 4/021
See application file for complete search history.

(56) References Cited

U.S. PATENT DOCUMENTS

| | | | |
|---|---|---|---|
| 7,353,084 B2 * | 4/2008 | Schaper | H02J 7/0049 700/297 |
| 9,108,503 B2 | 8/2015 | Wang et al. | |
| 9,643,512 B2 * | 5/2017 | Soo | B60L 1/006 |
| 9,849,871 B2 | 12/2017 | Dunlap et al. | |
| 9,987,944 B2 | 6/2018 | Dunlap et al. | |
| 10,065,630 B2 | 9/2018 | Endo et al. | |
| 10,661,678 B2 * | 5/2020 | Vidhi | G07F 15/005 |

(Continued)

*Primary Examiner* — Gonzalo Laguarda

(74) *Attorney, Agent, or Firm* — David B Kelley; Brooks Kushman P.C.

(57) ABSTRACT

A controller of a vehicle, while the vehicle is within a predefined geofenced region and responsive to the vehicle entering park, increases a maximum state of charge threshold for the battery and decreases a minimum state of charge threshold for the battery. The controller also, while the vehicle is located within the predefined geofenced region and responsive to the vehicle exiting park, decreases the maximum state of charge threshold and increases the minimum state of charge threshold.

19 Claims, 4 Drawing Sheets

(56) References Cited

U.S. PATENT DOCUMENTS

| | | |
|---|---|---|
| 10,744,892 B2 | 8/2020 | Bell et al. |
| 2015/0046007 A1 | 2/2015 | Wakashiro et al. |
| 2017/0253245 A1 | 9/2017 | Khafagy et al. |
| 2022/0289070 A1* | 9/2022 | Schleder ................. B60L 55/00 |

* cited by examiner

OPERATION OF VEHICLE STATIONARY GENERATOR

TECHNICAL FIELD

The present disclosure relates to a system for managing a stationary generator powertrain of a vehicle.

BACKGROUND

Some vehicles are provided with power onboard features to supply electric power to an external device. For instance, the vehicles may be provided with a hybrid drivetrain including an engine consuming conventional fuel (e.g. gasoline) and a traction battery to store electric power. A controller may operate the engine to generate electricity.

SUMMARY

A drivetrain system of a vehicle includes a battery and a controller. The controller, while the vehicle is within a predefined geofence and responsive to the vehicle entering park, increases a maximum state of charge threshold for the battery and decreases a minimum state of charge threshold for the battery. The controller also, while the vehicle is located within the predefined geofence and responsive to the vehicle exiting park, decreases the maximum state of charge threshold and increases the minimum state of charge threshold.

A method includes, responsive to detecting a geofenced region in an upcoming path of a vehicle, increasing a maximum state of charge threshold for a battery of the vehicle and decreasing a minimum state of charge threshold for the battery before the vehicle enters the geofenced region, and while the vehicle is in park within the geofenced region and responsive to ambient noise exceeding a threshold, decreasing the maximum state of charge threshold for the battery and increasing the minimum state of charge threshold for the battery.

A vehicle includes an engine and a controller. The controller, while the vehicle is within a geofenced region and a next closest vehicle is less than a threshold distance away from the vehicle, operates the engine at a first idle speed, and while the vehicle is within the geofenced region and the next closest vehicle is greater than the threshold distance away from the vehicle, operates the engine at a second idle speed greater than the first idle speed.

DETAILED DESCRIPTION

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the present invention. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

The present disclosure, among other things, proposes a system for vehicle power generation while stationary.

Figure 1:
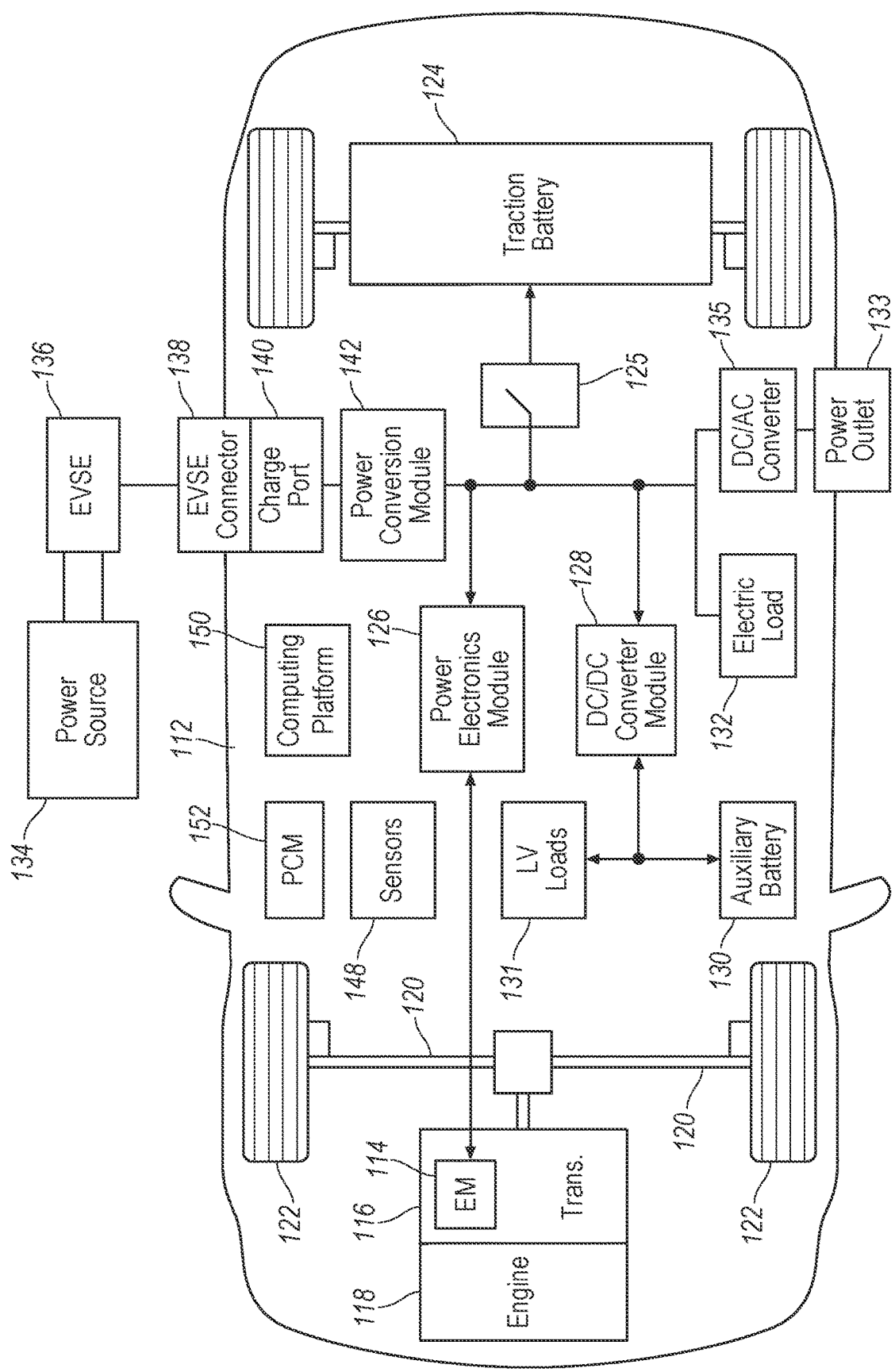
FIG. 1 illustrates an example block topology of an electrified vehicle illustrating drivetrain and energy storage components.

FIG. 1 depicts an electrified vehicle 112 that may be referred to as a plug-in hybrid-electric vehicle (PHEV), a battery electric vehicle (BEV), a mild hybrid-electric vehicle (MHEV), and/or a full hybrid electric vehicle (FHEV). A plug-in hybrid-electric vehicle 112 may comprise one or more electric machines 114 mechanically coupled to a hybrid transmission 116. The electric machines 114 may be capable of operating as a motor or a generator. In addition, the hybrid transmission 116 is mechanically coupled to an engine 118. The hybrid transmission 116 is also mechanically coupled to a drive shaft 120 that is mechanically coupled to the wheels 122. The electric machines 114 can provide propulsion and braking capability when the engine 118 is turned on or off. The electric machines 114 may also act as generators and can provide fuel economy benefits by recovering energy that would normally be lost as heat in a friction braking system. The electric machines 114 may also reduce vehicle emissions by allowing the engine 118 to operate at more efficient speeds and allowing the hybrid-electric vehicle 112 to be operated in electric mode with the engine 118 off under certain conditions.

A traction battery or battery pack 124 may store energy that can be used by the electric machines 114. The vehicle battery pack 124 may provide a high voltage direct current (DC) output. The traction battery 124 may be electrically coupled to one or more power electronics modules 126 (such as a traction inverter). One or more contactors 125 may isolate the traction battery 124 from other components when opened and connect the traction battery 124 to other components when closed. The power electronics module 126 is also electrically coupled to the electric machines 114 and provides the ability to bi-directionally transfer energy between the traction battery 124 and the electric machines 114. For example, a traction battery 124 may provide a DC voltage while the electric machines 114 may operate with a three-phase alternating current (AC) to function. The power electronics module 126 may convert the DC voltage to a three-phase AC current to operate the electric machines 114. In a regenerative mode, the power electronics module 126 may convert the three-phase AC current from the electric machines 114 acting as generators to DC voltage compatible with the traction battery 124.

The vehicle 112 may include a variable-voltage converter (VVC) (not shown) electrically coupled between the traction battery 124 and the power electronics module 126. The VVC may be a DC/DC boost converter configured to increase or boost the voltage provided by the traction battery 124. By increasing the voltage, current requirements may be decreased leading to a reduction in wiring size for the power electronics module 126 and the electric machines 114. Further, the electric machines 114 may be operated with better efficiency and lower losses.

In addition to providing energy for propulsion, the traction battery 124 may provide energy for other vehicle electrical systems. The vehicle 112 may include a DC/DC converter module 128 that converts the high voltage DC output of the traction battery 124 to a low voltage DC supply that is compatible with low-voltage vehicle loads. An output of the DC/DC converter module 128 may be electrically coupled to an auxiliary battery 130 (e.g., 12V battery) for charging the auxiliary battery 130. The low-voltage systems having one or more low-voltage loads 131 that may be electrically coupled to the auxiliary battery 130. One or more electrical loads 132 may be coupled to the high-voltage bus/rail. The electrical loads 132 may have an associated controller that operates and controls the electrical loads 146 when appropriate. Examples of electrical loads 132 may be a fan, an electric heating element, and/or an air-conditioning compressor. The vehicle 112 may be further configured to provide electric power supply to an external power device (not shown) via one or more power outlets (power sockets) 133 through a DC/AC converter 135. The power outlet 133 may be located inside and/or outside the vehicle cabin. For instance, the power outlet 133 may be receptacles configured to correspond to NEMA connectors used in North America, although power receptacles supporting other standards may be used under essentially the same concept. The DC/AC converter 135 may be electrically coupled between the traction battery 124 and the power outlet 133 and configured to convert the high voltage DC current from the traction battery 124 into an AC current with a corresponding voltage (e.g. 110V, 220V or the like) compatible with the external power devices.

The electrified vehicle 112 may be configured to recharge the traction battery 124 from an external power source 134. The external power source 134 may be a connection to an electrical outlet. The external power source 134 may be electrically coupled to a charger or electric vehicle supply equipment (EVSE) 136. The external power source 134 may be an electrical power distribution network or grid as provided by an electric utility company. The EVSE 136 may provide circuitry and controls to regulate and manage the transfer of energy between the power source 134 and the vehicle 112. The external power source 134 may provide DC or AC electric power to the EVSE 136. The EVSE 136 may have a charge connector 138 for plugging into a charge port 140 of the vehicle 112. The charge port 140 may be any type of port configured to transfer power from the EVSE 136 to the vehicle 112. The charge port 140 may be electrically coupled to a charger or onboard power conversion module 142. The power conversion module 142 may condition the power supplied from the EVSE 136 to provide the proper voltage and current levels to the traction battery 124. The power conversion module 142 may interface with the EVSE 136 to coordinate the delivery of power to the vehicle 112. The EVSE connector 138 may have pins that mate with corresponding recesses of the charge port 140. Alternatively, various components described as being electrically coupled or connected may transfer power using a wireless inductive coupling.

The vehicle 112 may be provided with various sensors 148 to perform various measurements. As a few non-limiting examples, the sensors 148 may include one or more light sensors configured to measure an intensity of light of the surrounding environment of the vehicle to enable automatic vehicle lighting adjustment and determine a time of the day (e.g. day or night). The sensors 148 may further include one or more temperature sensors configured to measure an ambient temperature which may affect the driving range of the vehicle 112. The temperature sensors 148 may be further configured to measure temperatures of various components of the vehicle 112 (e.g. a catalytic converter). The sensors 148 may further include a sound sensor configured to detect and measure ambient sound/noise of the vehicle 112. The sensors 148 may further include an electric sensor in communication with the power outlet 133 configured to detect the type of the external power devices connected to the power outlet 133. The sensor data may be transmitted to a controller or computing platform 150 for processing and analysis.

The vehicle 112 may be provided with a powertrain control module (PCM) 152 configured to operate the drivetrain of the vehicle 112. In the driving mode, the PCM 152 may monitor vehicle status data such as the speed and operate the engine 118, electric machine 116 and vehicle transmission 114 to adapt to various driving needs. In the regenerative mode, the PCM 152 may operate the electric machine 114 operating as a generator to convert the AC current generated by the vehicle motion to DC voltage compatible with the traction battery 124. The vehicle 112 may be further configured support a power generating mode while stationary (i.e. parked). The PCM 152 may be configured control and adjust the operation of the engine 118 based on a power output demand from the power outlet 133 and the SOC of the battery 124. For instance, while the traction battery 124 supplies electric power to an external device via the power outlet 133, the PCM may be configured to start the engine 118 to charge the traction battery responsive to the SOC decreasing below a low threshold. Responsive to the SOC increasing above a high threshold, the PCM 152 may stop the engine 118 to conserve fuel and reduce noise and emission. The PCM may be further configured to adjust the revolution-per-minute (RPM) and/or torque output of the engine 118 based on the power demand.

Figure 2:
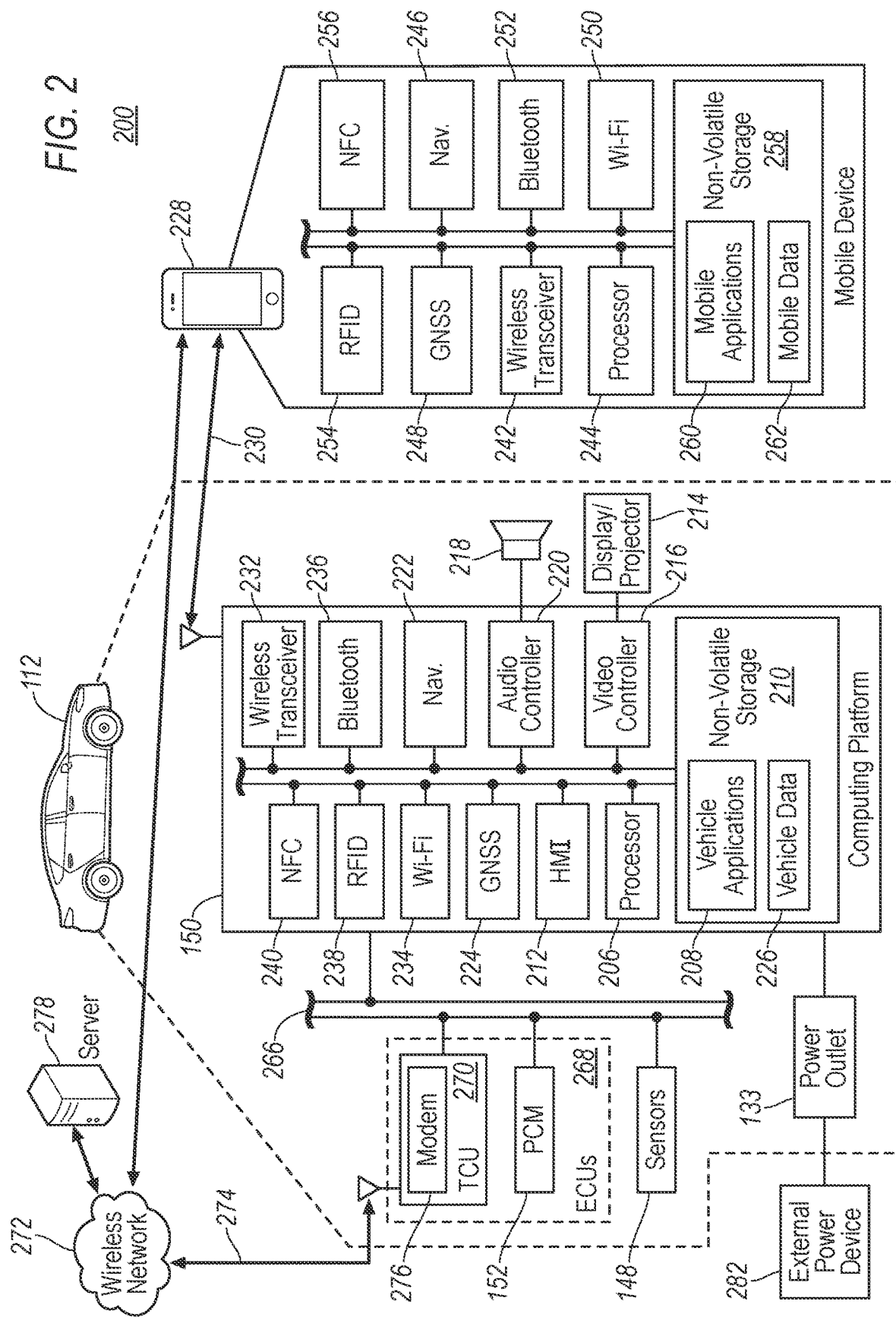
FIG. 2 illustrates an example diagram of a system controller and a battery electric control module.

Referring to FIG. 2, an example block topology of a vehicle system 200 of one embodiment of the present disclosure is illustrated. As an example, the system 200 may include the SYNC system manufactured by The Ford Motor Company of Dearborn, Mich. It should be noted that the illustrated system 200 is merely an example, and more, fewer, and/or differently located elements may be used.

As illustrated in FIG. 2, the computing platform 150 may include one or more processors 206 configured to perform instructions, commands, and other routines in support of the processes described herein. For instance, the computing platform 150 may be configured to execute instructions of vehicle applications 208 to provide features such as navigation, remote controls, and wireless communications. Such instructions and other data may be maintained in a non-volatile manner using a variety of types of computer-readable storage medium 210. The computer-readable medium 210 (also referred to as a processor-readable medium or storage) includes any non-transitory medium (e.g., tangible medium) that participates in providing instructions or other data that may be read by the processor 206 of the computing platform 150. Computer-executable instructions may be compiled or interpreted from computer programs created using a variety of programming languages and/or technologies, including, without limitation, and either alone or in combination, Java, C, C++, C#, Objective C, Fortran, Pascal, Java Script, Python, Perl, and PL/SQL.

The computing platform 150 may be provided with various features allowing the vehicle occupants/users to interface with the computing platform 150. For example, the computing platform 150 may receive input from HMI controls 212 configured to provide for occupant interaction with the vehicle 112. As an example, the computing platform 150 may interface with one or more buttons, switches, knobs, or other HMI controls configured to invoke functions on the computing platform 150 (e.g., steering wheel audio buttons, a push-to-talk button, instrument panel controls, etc.).

The computing platform 150 may also drive or otherwise communicate with one or more displays 214 configured to provide visual output to vehicle occupants by way of a video controller 216. In some cases, the display 214 may be a touch screen further configured to receive user touch input via the video controller 216, while in other cases the display 214 may be a display only, without touch input capabilities. As a few non-limiting examples, the display 214 may be implemented as a liquid crystal display (LCD) screen mounted on the dashboard inside the vehicle 112. Additionally or alternatively, the display 214 may be a projector mounted inside or outside the vehicle cabin configured to project an image onto a surface to interact with the vehicle user. In case that the vehicle 112 is a pickup truck having an open bed, the projector 214 may be mounted on an edge or rail of the bed and configured to project the image onto a rear window of the vehicle cabin allowing a user behind the vehicle to see the image. Alternatively, the projector 214 may be installed inside the vehicle cabin and project the image onto the rear window from the inside which still allows the user to see the image from the outside. The computing platform 150 may also drive or otherwise communicate with one or more speakers 218 configured to provide audio output and input to vehicle occupants by way of an audio controller 220.

The computing platform 150 may also be provided with navigation and route planning features through a navigation controller 222 configured to calculate navigation routes responsive to user input via, for example, the HMI controls 212, and output planned routes and instructions via the speaker 218 and the display 214. Location data that is needed for navigation may be collected from a global navigation satellite system (GNSS) controller 224 configured to communicate with multiple satellites and calculate the location of the vehicle 112. The GNSS controller 224 may be configured to support various current and/or future global or regional location systems such as global positioning system (GPS), Galileo, Beidou, Global Navigation Satellite System (GLONASS) and the like. Map data used for route planning may be stored in the storage 210 as a part of the vehicle data 226. Navigation software may be stored in the storage 210 as one of the vehicle applications 208.

The computing platform 150 may be configured to wirelessly communicate with a mobile device 228 of the vehicle users/occupants via a wireless connection 230. The mobile device 228 may be any of various types of portable computing devices, such as cellular phones, tablet computers, wearable devices, smart watches, smart fobs, laptop computers, portable music players, or other devices capable of communication with the computing platform 150. A wireless transceiver 232 may be in communication with a Wi-Fi controller 234, a Bluetooth controller 236, a radio-frequency identification (RFID) controller 238, a near-field communication (NFC) controller 240, and other controllers such as a Zigbee transceiver, an IrDA transceiver, a ultra-wide band (UWB) controller (not shown), and be configured to communicate with a compatible wireless transceiver 242 of the mobile device 228.

The mobile device 228 may be provided with a processor 244 configured to perform instructions, commands, and other routines in support of the processes such as navigation, telephone, wireless communication, and multi-media processing. For instance, the mobile device 228 may be provided with location and navigation functions via a navigation controller 246 and a GNSS controller 248. The mobile device 228 may be provided with the wireless transceiver 242 in communication with a Wi-Fi controller 250, a Bluetooth controller 252, a RFID controller 254, an NFC controller 256, and other controllers (not shown), configured to communicate with the wireless transceiver 232 of the computing platform 150. The mobile device 228 may be further provided with a non-volatile storage 258 to store various mobile application 260 and mobile data 262.

The computing platform 150 may be further configured to communicate with various components of the vehicle 112 via one or more in-vehicle networks 266. The in-vehicle network 266 may include, but is not limited to, one or more of a controller area network (CAN), an Ethernet network, and a media-oriented system transport (MOST), as some examples. Furthermore, the in-vehicle network 266, or portions of the in-vehicle network 266, may be a wireless network accomplished via Bluetooth low-energy (BLE), Wi-Fi, UWB, or the like.

The computing platform 150 may be configured to communicate with various electronic control units (ECUs) 268 of the vehicle 112 configured to perform various operations. For instance, the ECUs 268 may include a telematics control unit (TCU) 270 configured to control telecommunication between vehicle 112 and a wireless network 272 through a wireless connection 274 using a modem 276. The wireless connection 274 may be in the form of various communication networks, for example, a cellular network. Through the wireless network 272, the vehicle may access one or more servers 278 to access various content for various purposes. It is noted that the terms wireless network and server are used as general terms in the present disclosure and may include any computing network involving carriers, routers, computers, controllers, circuitry or the like configured to store data and perform data processing functions and facilitate communication between various entities.

As discussed above with reference to FIG. 1, the computing platform 150 and the PCM 152 may monitor and control the operation of the power outlet 133 that is configured to supply electric power to the external power device 282. The external power device 282 is used as a general term in the present disclosure and may include various devices, apparatuses, and hardware powered by electricity. As a few non-limiting examples, the external power devices 282 may include one or more power tools, electric lights, or the like each having a power rating. The sensors 148 may be configured to detect the type and power consumption of the external power devices 282 and report the detected information to the computing platform 150 and the PCM 152. Combined with the information indicative of the status of the battery 124 such as the temperature and SOC, the PCM may adjust the operation of the engine 118 and electric machine 114 to accommodate the power output demand while driving and/or stationary. Depending on the location at which the vehicle 112 is parked, noise and emission restrictions may be applied to the vehicle 112 to operate the engine 118. For instance, when the vehicle power generating feature is used on a camping site, there may be specific rules and restrictions on vehicle engine noise and emission varied by different jurisdictions. The computing platform 150 may be configured to determine a current jurisdiction using the location of the vehicle 112 from the GNSS controller 224 and obtain the rules and restrictions on noise and emission for the current jurisdiction from the server 278. The PCM 152 may be configured to support a campsite mode in which the engine operation may be adjusted based on the rules and restrictions.

Figure 3:
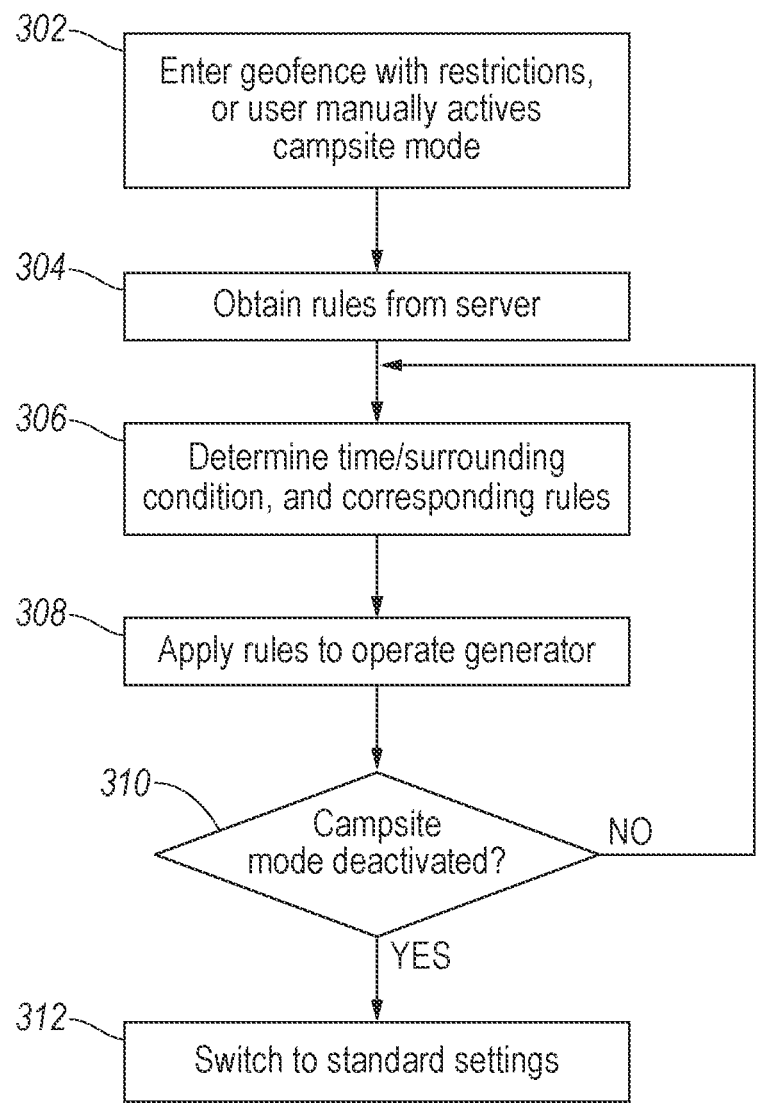
FIG. 3 illustrates an example flow diagram of a process for activating and deactivating the power generator in a campsite mode.

Referring to FIG. 3, a flow diagram of a process 300 for activating and deactivating the power generator in a campsite mode is illustrated. With continuing reference to FIGS. 1 and 2, it is noted that although the process 300 may be implemented via various components/controllers of the vehicle 112, the following description will be made primarily with reference to the PCM 152 and the computing platform 150 for simplicity purposes. At operation 302, responsive to detecting the vehicle 112 has entered a pre-defined geofence within which vehicle power generator noise and/or emission rules and restrictions apply, the vehicle 112 activates the campsite mode. The geofence may be stored as a part of vehicle map data 226 processed via the vehicle navigation controller 222. Additionally or alternatively, the vehicle 112 may download the geofence data from the server 278 via the wireless network 272 in a real-time manner in situations such as real-time cloud navigation. The geofence may cover a geographical area designated to apply certain rules and restrictions on vehicle noise and emission. For instance, the geofence may cover a recreational area (e.g. a park, campsite), a residential area, and/or a business area within which vehicle generator usage may be restricted since a running vehicle generator may produce significantly more noise and emission than the engine idling. Additionally or alternatively, the campsite power generator mode may be manually activated by a user input via the HMI 212. Responsive to the activation of the campsite power generator mode, at operation 304, the computing platform 105 obtains the rules and restrictions designated for the geofence from the server 278. Alternatively, the vehicle 112 may already have the rules and restrictions stored in the storage 210 given the geofence may have been pre-defined and held in the vehicle memory (e.g. in situations such as the vehicle 112 having previously been in the geofence). Alternatively, the vehicle 112 may pre-download the rules and restrictions if the geofence location is predicted as a destination via the navigation controller 222 before arriving.

At operation 306, the computing platform 150 analyzes the rules and restrictions as obtained and determines which corresponding rules and restrictions are applicable to the vehicle power generator based on day of the week, time, surrounding conditions as well as other factors. The rules and restrictions in a given area may vary by a variety of factors. As a few non-limiting examples, the rules and restrictions may vary by the date or day in the week. A campsite may have one set of rules for weekdays and different set of rules on weekends and/or holidays. Similarly, the rules and restrictions may also vary by time of day (e.g. daytime before dust/night before dawn). The vehicle 112 may determine the date and time using an internal clock (not shown). Additionally or alternatively, the vehicle 112 may further measure a surrounding light condition using the light sensor 148 to determine dusk and dawn such that appropriate adjustment may be made. The rules and restrictions may further vary by the presence of other camping vehicles near the vehicle 112. For instance, a campsite may have relaxed rules on emissions and noise if no others are camped within fifty feet from the vehicle 112 and more stringent rules may apply if other campers are presents within the distance. The vehicle 112 may obtain the information of the surrounding camping conditions from the server 278 to which the camping vehicles report to. Additionally or alternatively, the computing platform 150 may ask for user input via the HMI 212 to obtain the information. At operation 308, the PCM 152 operates the power generator of the vehicle 112 as coordinated by the computing platform 150 in compliance with rules and restrictions determined. At operation 310, the computing platform 150 determines if the campsite power generator mode has been deactivated. The campsite power generator mode may be deactivated by various causes. For instance, the user may manually deactivate and switch back to a standard power generator mode. The vehicle may shift out of park and start to drive in which case the campsite mode may be automatically deactivated. Alternatively, the PCM 152 may deactivate the campsite generator mode responsive to detecting sufficient ambient noise indicating the quiet environment is no longer available via the sensor 148. If the campsite mode is deactivated, the process proceeds to operation 312 and the PCM 152 switches to the standard power generator mode. Otherwise, if the answer is a no, the process returns to operation 306 and the computing platform 150 determines if any of the conditions related to the rules and restrictions has changed to adjust the PCM operation accordingly.

While operating in the campsite generator mode, the PCM 152 may adjust the engine speed and torque to accommodate the noise and emission requirement. The PCM 152 may further extend an SOC window of the traction battery 124 to allow a prolonged engine off time. A standard battery SOC management control strategy may not charge the battery up to the top of the usable range to allow the ability to recapture energy from potential subsequent charging events (e.g. regenerative braking). In addition, the standard strategy may not allow the battery to discharge below a threshold to ensure the battery has a sufficient SOC to be used at a given time. Under the campsite generator mode, the PCM 152 may make use of the full useable SOC range by increasing the upper SOC threshold and decreasing the lower SOC threshold to accommodate a greater SOC window such that the engine start/stop may be operated in a less frequent manner. Additionally, the computing platform 150 may disable or limit ancillary/auxiliary power consumption responsive to entering the campsite power generator mode. Ancillary power consumption includes, but is not limited to, vehicle climate control, interior and exterior lighting, and audio.

Figure 4:
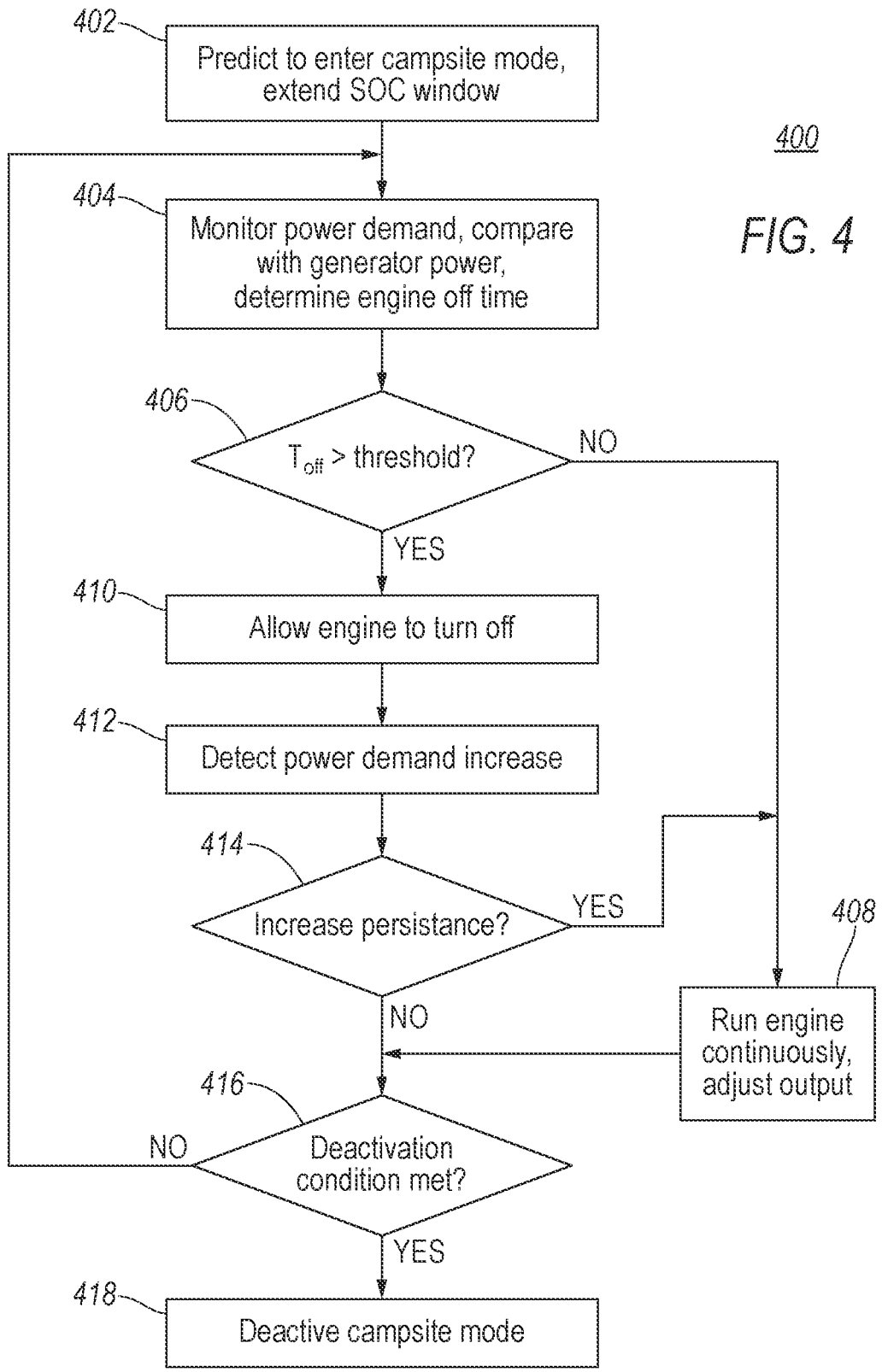
FIG. 4 illustrates an example flow diagram of a process for operating the power generator in the campsite mode.

Referring to FIG. 4, an example flow diagram of a process 400 for operating the vehicle in the power generator campsite mode is illustrated. With continuing reference to FIGS. 1-3, at operation 402, responsive to predicting the vehicle 112 will enter the generator campsite mode geographically (e.g. by the navigation destination) and/or temporally, the PCM 152 extends the SOC window and pre-charges the battery 124 such that the battery SOC will approach the upper threshold of the extended SOC window when the campsite mode is activated. Additionally, if already in the geofence, the vehicle 112 may be further configured to temporally predict to enter the generator campsite mode. In some areas, noise and emission restriction may only apply for a certain time interval (e.g. 9 PM-6 AM). Responsive to approaching the restricted time interval in prediction of the campsite mode, the vehicle 112 may extend the SOC window and pre-charge the battery 124. At operation 404, the computing platform 150 measures the power demand by the external power devices 282 through the power outlet 133 responsive to entering the campsite mode. The computing platform 150 compares the power demand from the external power devices 282 with the power generating capability of the generator 114 to determine how long the engine 118 may be turned off between each charging interval. Since the power generating capability may be limited in the campsite mode due to the noise and emission restrictions, the power generating capability may be insufficient to fulfill the power demand in certain situations. In other cases, the power generating capability may be barely sufficient to fulfill the power demand from the external devices 282 and the engine 118 may be only turned off for a short period of time before the SOC of the battery 124 drops below the lower threshold of the extended SOC window when the engine 118 has to restart to charge the battery 124. If the engine off and time is too short, it may be better to leave the engine on to reduce noise and power consumption for repeated engine starts. Additionally, keeping the catalytic converter at a hot operating temperature may reduce emission. At operation 406, the computing platform 150 compares the predicted engine off time with a time threshold (e.g. 10 minute). If the engine off time is less than the threshold, the process proceeds to operation 408 and the PCM 152 keeps the engine 118 running continuously without stop. The PCM 152 may further adjust the power generator output to match the power demand such that the noise and emission impact may be minimized.

If at operation 406 the computing platform 150 determines the engine off time is greater than the threshold, the process proceeds to operation 410 and the PCM 152 allows the engine to turn off and restart to keep the SOC within the extended SOC window. The power demand from the external devices 282 may change over time. At operation 412, responsive to detecting a significant increase of the power demand that reduces the engine off time to below the threshold, the computing platform 150 determines if the power demand increase is persistent at operation 414. For instance, the power increase may be caused by a temporary using of a device such as a microwave oven which usually lasts a short period of time. The computing platform 150 may predict the length of the power increase by identifying the type of device that caused the power increase through different power outlet sockets (e.g. each device may be associated with a particular socket). If the power increase is persistent, the process proceeds from operation 414 to operation 408 to keep the engine continuously running. Otherwise, if the computing platform 150 predicts the power increase is not only temporary, the PCM keeps the current control scheme to allow the engine to turn on and off and the process proceeds to operation 416 to determine if the generator campsite mode deactivation condition has been met, which has been described above with reference to FIG. 3. If the deactivation condition is not met, the process returns to operation 404 to continue to operate the generator 114 in the campsite mode. Otherwise, if the deactivation condition is met, the process proceeds to operation 418 to deactivate the campsite mode.

The processes, methods, or algorithms disclosed herein can be deliverable to/implemented by a processing device, controller, or computer, which can include any existing programmable electronic control unit or dedicated electronic control unit. Similarly, the processes, methods, or algorithms can be stored as data and instructions executable by a controller or computer in many forms including, but not limited to, information permanently stored on non-writable storage media such as Read Only Memory (ROM) devices and information alterably stored on writeable storage media such as floppy disks, magnetic tapes, Compact Discs (CDs), Random Access Memory (RAM) devices, and other magnetic and optical media. The processes, methods, or algorithms can also be implemented in a software executable object. Alternatively, the processes, methods, or algorithms can be embodied in whole or in part using suitable hardware components, such as Application Specific Integrated Circuits (ASICs), Field-Programmable Gate Arrays (FPGAs), state machines, controllers or other hardware components or devices, or a combination of hardware, software and firmware components.

While exemplary embodiments are described above, it is not intended that these embodiments describe all possible forms encompassed by the claims. The words used in the specification are words of description rather than limitation, and it is understood that various changes can be made without departing from the spirit and scope of the disclosure.

As previously described, the features of various embodiments can be combined to form further embodiments that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes may include, but are not limited to cost, strength, durability, life cycle cost, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and can be desirable for particular applications.

What is claimed is:

1. A drivetrain system of a vehicle comprising:
an engine;
a battery; and
a controller programmed to,
while the vehicle is within a predefined geofence and responsive to the vehicle entering park, increase a maximum state of charge threshold for the battery and decrease a minimum state of charge threshold for the battery,
while the vehicle is located within the predefined geofence and responsive to the vehicle exiting park, decrease the maximum state of charge threshold and increase the minimum state of charge threshold, and
responsive to the vehicle entering the predefined geofence, decrease an idle speed of the engine, and responsive to the vehicle exiting the predefined geofence, increase the idle speed.

2. The drivetrain system of claim 1, wherein the controller is further programmed to, while the vehicle is located within the predefined geofence and responsive to ambient noise exceeding a threshold, increase the idle speed.

3. The drivetrain system of claim 1, wherein the controller is further programmed to, while the vehicle is located within the predefined geofence and responsive to a next closest vehicle being greater than a threshold distance away from the vehicle, increase the idle speed.

4. The drivetrain system of claim 1 further comprising a climate control system, wherein the controller is further programmed to, while the vehicle is located within the predefined geofence and responsive to the vehicle entering park, decrease power available to the climate control system.

5. The drivetrain system of claim 4, wherein the controller is further programmed to, while the vehicle is located within the predefined geofence and responsive to ambient noise exceeding a threshold, increase power available to the climate control system.

6. The drivetrain system of claim 4, wherein the controller is further programmed to, while the vehicle is located within the predefined geofence and responsive to a next closest vehicle being greater than a threshold distance away, increase power available to the climate control system.

7. The drivetrain system of claim 1 further comprising cabin lights, wherein the controller is further programmed to, while the vehicle is located within the predefined geofence and responsive to the vehicle entering park, decrease power available to the cabin lights.

8. The drivetrain system of claim 7, wherein the controller is further programmed to, while the vehicle is located within the predefined geofence and responsive to ambient noise exceeding a threshold, increase the power available.

9. The drivetrain system claim 7, wherein the vehicle is further programmed to, while the vehicle is located within the predefined geofence and responsive to a next closest vehicle being greater than a threshold distance away, increase the power available.

10. A method comprising:
responsive to detecting a geofenced region in an upcoming path of a vehicle, increasing a maximum state of charge threshold for a battery of the vehicle and decreasing a minimum state of charge threshold for the battery before the vehicle enters the geofenced region; and
while the vehicle is in park within the geofenced region and responsive to ambient noise exceeding a threshold, decreasing the maximum state of charge threshold and increasing the minimum state of charge threshold.

11. The method of claim 10 further comprising, responsive to the vehicle entering park within the geofenced region, decreasing an idle speed of an engine of the vehicle.

12. The method of claim 11 further comprising, while the vehicle is in park within the geofenced region and responsive to the ambient noise exceeding the threshold, increasing the idle speed.

13. The method of claim 10 further comprising, responsive to the vehicle entering park within the geofenced region, decreasing power available to a climate system of the vehicle.

14. The method of claim 13 further comprising, while the vehicle is in park within the geofenced region and responsive to the ambient noise exceeding the threshold, increasing the power available.

15. The method of claim 10 further comprising, responsive to the vehicle entering park within the geofenced region, decreasing power available to cabin lights of the vehicle.

16. The method of claim 15 further comprising, while the vehicle is in park within the geofenced region and responsive to the ambient noise exceeding the threshold, increasing the power available.

17. A vehicle comprising:
an engine; and
a controller programmed to,
while the vehicle is within a geofenced region and a next closest vehicle is less than a threshold distance away from the vehicle, operate the engine at a first idle speed, and
while the vehicle is within the geofenced region and the next closest vehicle is greater than the threshold distance away from the vehicle, operate the engine at a second idle speed greater than the first idle speed.

18. The vehicle of claim 17, while the vehicle is within the geofenced region and ambient noise is less than a threshold, operate the engine at the first idle speed.

19. The vehicle of claim 18, while the vehicle is within the geofenced region and the ambient noise is greater than the threshold, operate the engine at the second idle speed.

* * * * *